United States Patent [19]

Wells

[11] Patent Number: 5,551,374

[45] Date of Patent: Sep. 3, 1996

[54] AUTOMATED NIPPLE LIVESTOCK FEEDER AND METHOD OF OPERATION

[76] Inventor: John A. Wells, 7280 Hoxie Rd., North Adams, Mich. 49262-9778

[21] Appl. No.: 326,653

[22] Filed: Oct. 20, 1994

[51] Int. Cl.⁶ .................. A01K 9/00; A01K 5/02
[52] U.S. Cl. ........................... 119/71; 119/57.92
[58] Field of Search ................... 119/71, 51.02, 119/57.92, 72, 72.5, 56.2

[56] References Cited

U.S. PATENT DOCUMENTS

| | | |
|---|---|---|
| 3,204,607 | 9/1965 | Arnold et al. . |
| 3,307,521 | 3/1967 | Tavera et al. . |
| 3,313,272 | 4/1967 | Moloney ................... 119/71 |
| 3,628,506 | 12/1971 | Glasbergen . |
| 3,664,302 | 5/1972 | Wienert . |
| 4,291,647 | 9/1981 | Legrain . |
| 4,502,416 | 3/1985 | Keysell et al. . |
| 4,550,685 | 11/1985 | Förster . |
| 4,788,940 | 12/1988 | Förster . |
| 4,803,955 | 2/1989 | Gonsalves ................. 119/71 |
| 4,993,365 | 2/1991 | Weerstra ................... 119/71 |
| 5,205,240 | 4/1993 | Colas et al. . |
| 5,355,833 | 10/1994 | Legrain ................. 119/57.92 |

FOREIGN PATENT DOCUMENTS

| | | | |
|---|---|---|---|
| 1109094 | 8/1984 | U.S.S.R. ................. 119/71 |
| 1333269 | 8/1987 | U.S.S.R. ................. 119/71 |
| 1351548 | 11/1987 | U.S.S.R. ................. 119/72 |
| 1360672 | 12/1987 | U.S.S.R. ............... 119/51.02 |

Primary Examiner—Todd E. Manahan
Attorney, Agent, or Firm—Harness, Dickey & Pierce, P.L.C.

[57] ABSTRACT

This is an automatic livestock feeder and the method of operation. The feeder includes a stationary mixing system in which formula is mixed in batches, a movable traveler having a nipple for sucking on by animals housed within individual stalls with a flexible formula hose connecting the mixing system to the delivery system. A pump is used to pump formula from the mixing system to the delivery system through the formula hose and a return line is provided to return formula from the pump back to the mixing system. A selector valve controlled by a vacuum switch in communication with a nipple on the delivery system is used to determine in which direction the formula is pumped. The feeder is operated by mixing a plurality of batches of formula which are then pumped to individual animals until all the animals along a predetermined path of the delivery system have been fed. A programmable controller is provided to operate the feeder and record the amount of formula consumed by each animal. In addition, the controller insures that the total quantity of formula mixed is substantially equal to the total formula consumed such that essentially no formula is left over after the animals have been fed.

23 Claims, 3 Drawing Sheets

AUTOMATED NIPPLE LIVESTOCK FEEDER AND METHOD OF OPERATION

BACKGROUND AND SUMMARY OF THE INVENTION

The present invention relates to an automated livestock feeder. The feeder utilizes a single speed pump with a vacuum switch activated selector valve to regulate the flow of formula. The feeder controller is capable of delivering a predetermined amount of formula to each animal and records the amount of formula actually consumed by each animal.

The most labor intensive task of raising livestock contained in individual stalls, such as veal calves, is the task of feeding. Nearly all veal calves are fed by a system that requires an operator to blend milk powder with hot water in a large tank. Each animal has his own stall, so the operator must meter a portion of the prepared feed into a pail for each animal with a pump and hose system. This requires an operator to be present at each feeding. To meet this labor scheduling requirement, feeding is generally limited to twice per day, at twelve hour intervals. There is also an opportunity for error in measuring the ingredients and in measuring the portions for each animal. It has been shown that more frequent feeding of the animals will produce more efficient weight gains. The only practical way to increase the number of feedings is to use an automatic feeding system which can operate several hours each day, or continuously, without the need for constant human involvement.

While automatic feeding systems have been developed, one or more shortcomings of these systems has prevented them from being successfully marketed. As a result, where livestock is raised in individual stalls, the feeding is still performed manually.

The automated livestock feeder of the present invention seeks to overcome the disadvantages of known automatic feeders resulting in a marketable system. The feeder of the present invention includes a mixing system, a formula delivery system and a controller which automates the operation of the formula mixing and delivery. The mixing system includes a mixing tank in which water and dry feed are mixed to form a liquid formula. The mixing tank is supported on a scale to enable the quantities of the individual ingredients to be weighed as they are introduced into the mixing tank. Once the formula is mixed, it is pumped from the mixing tank into a feed tank which is also supported on a scale for continuous monitoring of the quantity of formula within the feed tank. Formula is then pumped from the feed tank, through a flexible hose, to the delivery system.

The delivery system includes a traveler which moves about the barn from one stall to the next, delivering the liquid formula to the animal in each stall. The traveler includes a nipple through which the animals receive the formula by sucking. The traveler moves about the barn along a predetermined path past a number of stalls, stopping at each stall for the animal in each stall to receive formula. Each trip of the traveler along its path, is referred to as a feeding cycle.

During each feeding cycle, the formula is continuously pumped from the feed tank. An electro-mechanical selector valve in the formula line is controlled by a vacuum switch coupled to the nipple on the traveler. When an animal sucks on the nipple, producing a vacuum, the vacuum switch will close, moving the selector valve to a position in which formula is pumped to the nipple. Without the vacuum, the selector valve is moved to a position in which the pumped formula is recirculated back into the feed tank. The recirculation of the formula maintains the formula solids in suspension. When the traveler is moving between stalls or when a particular animal is sucking the formula at a rate slower than it is being pumped, the selector valve changes positions to recirculate the formula.

The controller fully controls all functions of both the formula mixing and delivery. The controller also records the amount of formula consumed by each animal and is programmable to provide a specific quantity of formula to each animal.

During each feeding cycle, several batches of formula are mixed in the mixing tank and supplied to the feed tank. It is one advantage of the present invention that as the traveler nears the end of a feeding cycle, the controller will determine the amount of additional formula required to complete the feeding cycle and mix a partial batch of formula. This ensures that there is no formula left over after the feeding cycle has been completed.

Further objects, features and advantages of the invention will become apparent from a consideration of the following description and the appended claims when taken in connection with the accompanying drawings.

DETAILED DESCRIPTION OF THE PREFERRED EMBODIMENT

The automated livestock feeder of the present invention includes a stationary mixing system for mixing liquid formula, a movable delivery system for delivering the formula to individual livestock stalls and a control system for controlling the operation of the mixing and delivery systems, as well as for recording data.

THE MIXING SYSTEM

Figure 1:
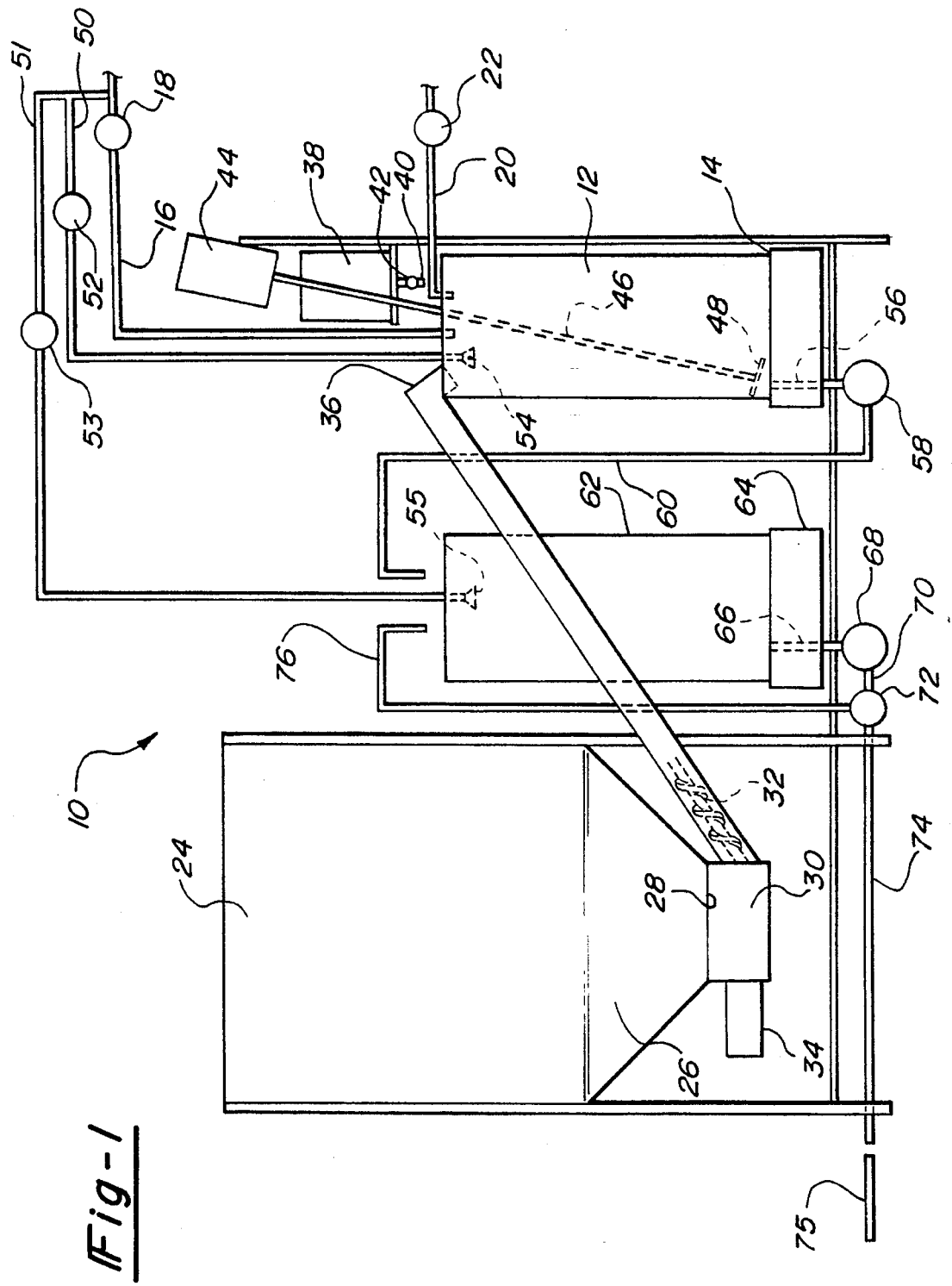
FIG. 1 is a schematic elevational view of the mixing system of the automatic livestock feeder of the present invention.

The mixing system of the livestock feeder of the present invention is shown in FIG. 1, and designated generally at 10. The mixing system 10 includes a mixing tank 12 which is supported by a mixing scale 14. The mixing tank 12 is open from above for receiving both liquid and dry ingredients necessary for producing a liquid formula. Hot water is supplied to the tank 12 through a hot water supply pipe 16 and is controlled by an electro-mechanical valve 18, such as a solenoid valve. Likewise, cold water is provided to the mixing tank through a cold water supply pipe 20 controlled by an electro-mechanical valve 22.

Dry feed is stored in a dry feed hopper 24 having a conical shaped lower end 26 leading to a discharge outlet 28. Dry feed flows by gravity from the hopper into the inlet 30 of a flex auger 32. An electric motor 34 drives the flex auger to deliver the dry feed through the auger outlet 36 above the mixing tank where the dry feed drops into the mixing tank. A liquid medication tank 38 is positioned above the mixing tank 12 and has a gravity fed outlet 40 controlled by an electro-mechanical valve 42. Additional dry and/or liquid feed hoppers may be provided if desired by the farmer. A mixer motor 44 is positioned above the mixing tank and is used to rotate a stir shaft 46 extending into the tank and having a stirring blade or paddle 48 at its lower end, near the bottom of the mixing tank 12. A second hot water supply 50, controlled by a valve 52, leads to a spray nozzle 54 at the upper end of the tank 12. Hot water is supplied to the nozzle 54 for rinsing formula from the tank 12 after use. A formula outlet pipe 56 at the lower end of the mixing tank leads to a transfer pump 58.

The transfer pump 58 pumps formula from the mixing tank 12, through a pipe 60, into a feed tank 62. The feed tank 62, like the mixing tank 12, is open from above and is supported by a feeding scale 64. A spray nozzle 55 supplies hot water directly to the feed tank. The water flow is controlled by valve 53. The feed tank 62 has a lower outlet pipe 66 leading to a feeding pump 68. Formula from the feed tank is pumped by the feeding pump 68 through a pipe 70 to a selector valve 72. Depending upon the position of the selector valve 72, formula is either pumped through a formula hose 74 to the delivery system of the automated livestock feeder, or the formula is pumped through a return pipe 76 back to the feed tank.

The formula hose 74 is contained within a cable 75 which includes electrical wires, a liquid sanitizer hose, and other hoses which are coupled to the delivery system. The cable 75 is carried within a flexible wear resistant conduit to protect the hoses and wires. The cable 75 can be dragged along on the floor of the barn or suspended from the ceiling of the barn.

THE DELIVERY SYSTEM

Figure 2:
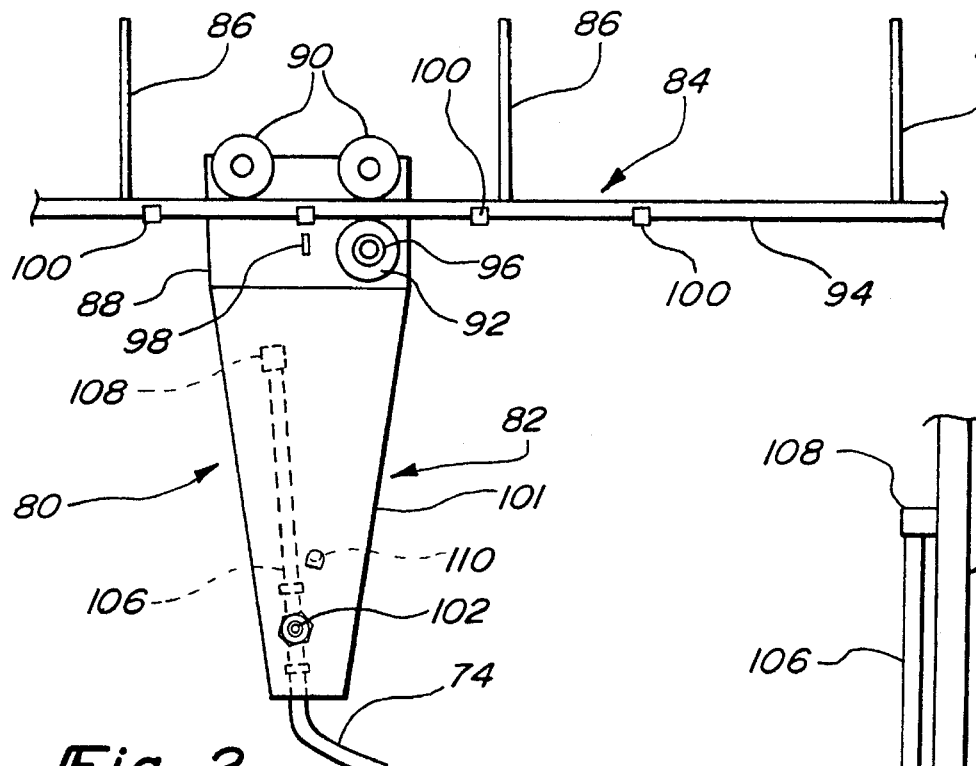
FIG. 2 is a schematic elevational view of the delivery system of a livestock feeder of the present invention.

The delivery system of the automated livestock feeder of the present invention is shown in FIG. 2 and designated generally at 80. The delivery system 80 includes a traveler 82 which is carried on a track 84 suspended from the ceiling of the barn by supports 86. The track 84 provides a path for movement of the traveler 82. The path extends from a home station, where the traveler is positioned between feeding cycles, past a plurality of livestock stalls in close proximity to each stall. The traveler 82 has an upper support and drive 88. The upper support and drive 88 includes a pair of wheels 90 which are carried upon the track 84 and which supports the traveler 82 on the track. Beneath the track 84 is a traction wheel 92 which engages a lower surface 94 of the track with the force from a biasing spring to ensure contact between the track and the wheel 92. A motor 96 is operable to rotate the traction wheel 92 to move the traveler 82 along the track 84. An alternative embodiment is to use the motor 96 to turn one of the upper wheels 90 provided the weight of the traveler provides sufficient friction to move the traveler. The upper support and drive 88 also carries a proximity sensor 98 which senses the presence of locator tabs 100 on the track 84 at each of the livestock stalls.

Figure 3:
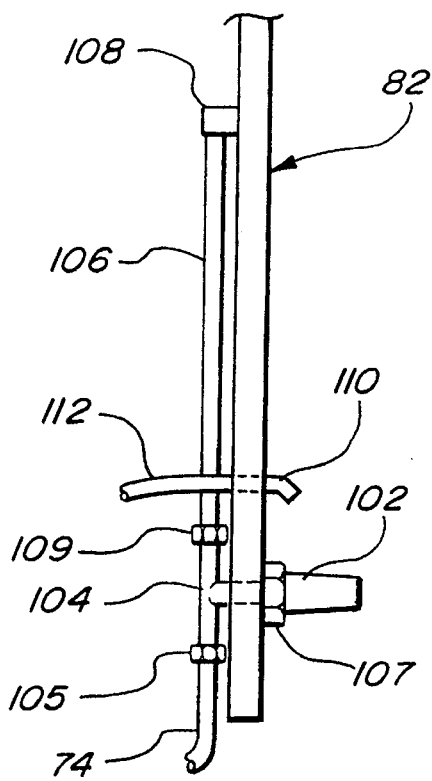
FIG. 3 is a side elevational view of the delivery system shown in FIG. 2.
Figure 4:
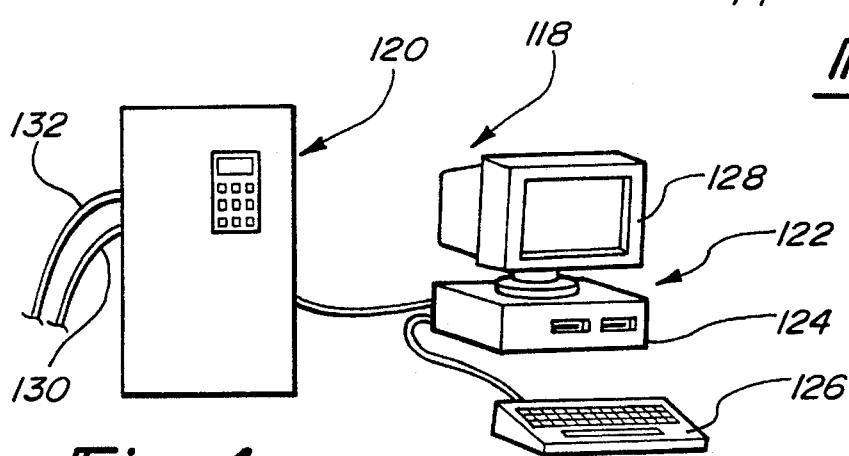
FIG. 4 is a schematic diagram of the controller of the automatic livestock feeder of the present invention.

The traveler 82 includes a lower support 101 which carries a projecting nipple 102, as shown in the side view of the traveler in FIG. 3. The nipple 102 is coupled to the formula hose 74 through a T-shaped coupling 104. The coupling 104 has a first fitting 105 connected to the formula hose 74 and a second fitting 107 connected to the nipple 102. A third fitting 109 of the T-shaped coupling 104 is connected to a tube 106 which extends upwardly from the nipple 102, to a raised vacuum switch 108. When an animal sucks on the nipple 102, a vacuum will be produced in the flexible tube 106. With sufficient vacuum, the switch 108 will close.

A spray nozzle 110 is positioned on the traveler 82 above the nipple 102. The spray nozzle is connected to a hose 112 which is included in the cable 75. When the traveler is moving from one stall to the next, a liquid sanitizing agent is sprayed from the nozzle 110, onto the nipple 102, to sanitize the nipple and prevent the spread of disease from one animal to another. The liquid sanitizer can be delivered by a pump or feed by gravity from a tank positioned above the nozzle 110 and controlled by a solenoid valve.

THE CONTROLLER

The operation of the livestock feeder of the present invention is managed by a computer-based industrial controller 120. A preferred controller is the Mistic Controller from Opto 22. The controller 120 is programmed with the use of a personal computer 122 having a central processing unit 124, a keyboard input device 126 and a monitor 128. The controller 120 receives input from the livestock feeder through an input cable 130, and directs the operation of the feeder through an output cable 132. The controller 120 is programmed through the use of a flowcharting programming language, Cyrano, developed by Opto 22 for use with the Mistic Controller.

In addition to programming the controller, the computer 122 is also used to store data and provide printouts to the operator. The stored data and printouts contain such information as the quantity of formula consumed by each animal during each feeding cycle, a cumulative formula consumption over a given period of time and the time taken by each animal to consume its ration.

THE FEEDER OPERATION

The feeder is programmed to perform a desired number of feeding cycles every 24 hours. A feeding cycle consists of one trip of the traveler 82 along its path, passed the livestock stalls. The feeder will typically be programmed for four to six feeding cycles per day. As a result of the automatic nature of the feeder, the labor required to feed the livestock is significantly reduced, enabling more feeding cycles per day with a smaller quantity of formula being delivered in each feeding cycle. This results in a greater efficiency in animal weight gain per unit of formula.

A feeding cycle begins with preheating of the feeder by opening the valve 18 allowing hot water to flow into the mixing tank. The hot water is pumped by the transfer pump 58 into the feed tank 62 and then pumped by the feeding pump 68 into the formula hose 74. Hot water is pumped into the formula hose 74 until it is completely filled. Once the hot water has been pumped from the mixing tank 12, formula is then mixed in the tank 12. Formula is mixed by first supplying a predetermined quantity of hot water to the mixing tank. Subsequently, the electric motor 34 of the flex auger 32 is operated, providing dry feed to the mixing tank. The mixer motor 44 is operated to turn the stir blade 48 in the tank 12, mixing the hot water with the dry feed to produce formula. Cold water is then added to bring the formula to the desired temperature and concentration. The quantities of hot water, dry powder and cold water introduced into the tank 12, are measured by the scale 14. The desired formula temperature is produced by the appropriate proportions of hot and cold water based on a predetermined knowledge of the hot and cold water temperatures. The water proportions may vary during the year to compensate for variations in the barn temperature to maintain a desired formula temperature. If more accurate formula temperature control is needed, a thermometer can be added in the mixing tank 12. The formula ingredients are added to the tank 12 one at a time. Any desired medication is added to the formula by opening the valve 42 on the medication tank 38. Once the formula has been mixed, the transfer pump 58 is used to pump the formula into the feed tank 62.

With the traveler 82 at its home station, where it is stored between feeding cycles, the feeding pump 68 is operated, pumping formula into the formula hose 74. As the formula is pumped into the formula hose, the hot water used to preheat the formula hose is pushed through the nipple 102, into a drain located at the home position of the traveler. Once the formula hose 74 is filled with formula, the feeder is now ready to begin delivery of the formula to the animals. The feeding pump 68 is continuously operated with the selector valve 72 in a position to recirculate formula to the feed tank once the formula hose 74 is filled with formula.

The motor 96 on the traveler is operated to move the traveler to the locator tab 100 on the track 84 at the first stall. The locator tab is sensed by the proximity sensor 98 on the traveler, causing the traveler to stop at that location. When the animal sucks on the nipple 102, a vacuum is created in the tube 106, causing the vacuum switch 108 to close. Upon closing of the switch 108, the selector valve 72 will switch positions, opening the path from the pump 68 to the formula hose 74 and closing the return pipe 76. As long as the animal continues to suck on the nipple 102, and take formula from the nipple at the rate at which it is being pumped to the nipple, the vacuum in the tube 106 will remain. However, if the animal does not take the formula at the same rate it is being pumped, formula will flow into the bottom portion of the tube 106, breaking the communication between the nipple 102 and the vacuum switch 108. As a result, the vacuum switch 108 will open, changing the position of the selector valve 72 so that formula will again be recirculated to the feed tank 62 instead of being pumped to the nipple. Once the animal consumes the formula in the tube 106, a vacuum will again be formed in the tube 106, closing the switch 108 and changing the position of the selector valve 72 so that formula is again pumped through the hose 74. The use of the selector valve 72 enables the pump 68 to be operated continuously without frequent starting and stopping, which would shorten the life of the pump. In addition, it enables the use of a relatively inexpensive single speed pump as opposed to a variable speed pump which varies the pumping rate to match the animal's sucking.

The feeder will be programmed to deliver a predetermined quantity of formula to each animal. The quantity delivered is measured by monitoring the feeding scale 64. Once the programmed amount has been delivered, the selector valve 72 is switched to recirculate formula back into the feed tank, irrespective of the vacuum switch 108. In the event an animal stops sucking on the nipple before the delivery of its programmed amount of feed, the vacuum switch 108 will open, and the selector valve changes position to recirculate the formula. The feeder is programmed to move the traveler to the next stall after the maximum quantity of formula has been delivered, or after a preset period of time, such as two minutes, of no sucking on the nipple by the animal prior to delivery of its complete ration of formula. The failure of an animal to consume its ration of formula is generally an indicator of an illness or over feeding and will be highlighted in a report to the operator.

After the first animal is fed, the traveler is moved to the next stall indicated by the next locator tab 100 on the track 84. As the traveler is moved, the sanitizer is sprayed on the nipple through the nozzle 110. Once the traveler has reached the next stall, the process is repeated.

A typical feeding cycle, will require the feed tank 62 to be filled with formula a number of times. As the feed tank approaches empty, as determined by the scale 64, additional formula will be mixed in the tank 12, as described previously. As the traveler nears the end of its cycle, the control system 118 will determine the amount of formula needed to complete the feeding cycle. This amount is calculated from the quantity of formula remaining in the feed tank and formula hose, and the amount needed to feed the remaining animals. A partial batch of formula will then be mixed and added to the feed tank so that there is little or no left over formula when the last animal has been fed.

During a feeding cycle, when there is insufficient formula remaining in the feed tank to feed the next animal, and additional formula is being mixed or has been mixed in the tank 12, the traveler unit will remain in position at the stall of the last animal fed until the tank 62 has been replenished with formula. Only when sufficient formula is available for the next animal will the traveler move to the next stall. At the end of the feeding cycle, when the last formula has been pumped from the tank 62, water will again be introduced into the mixing tank. This water is pumped into the feed tank and then pumped into the formula hose 74. This water pushes the last quantity of formula through the formula hose to the nipple to feed the last animal. The point at which the last undiluted formula is delivered to the last animal will coincide with the completion of that animal's formula ration. This so called "chaser water" is weighed in the feed tank to continue the measurement of formula to the last animal.

After the completion of the feeding cycle, the traveler 82 will return to its home position without stopping at any of the locator tabs. Once the traveler is at the home position, the system will be rinsed by first spraying the mixing tank with water from the spray nozzle 54 which is designed to spray the walls of the mixing tank and the stir shaft 46. This water is then pumped into the feed tank 62, rinsing the feed tank. Subsequently, the water is pumped through the formula hose 74 and nipple 102 where it then flows into the drain. The feed tank 62 is subsequently rinsed with water from the spray nozzle 55. The traveler remains at the home position until the beginning of the next feeding cycle.

When a new herd is initially placed on the feeder, the controller is programmed to deliver the same quantity of formula to each animal. When differences in weight gain or other variations in animal performance are observed between animals, the amounts of formula to each animal can be varied to compensate for the weight differences to produce a herd with nearly uniform sized animals.

The automated feeder has been shown and described as having one mixing tank supplying formula to one feed tank which then supplies the formula to one traveler. However, depending on the size of the herd, multiple feed tanks can be used which are all supplied with formula from a single mixer. Each feed tank has an associated traveler feeding a select portion of the herd.

ALTERNATIVE EMBODIMENTS

Several alternative embodiments of the feeder of the present invention are described below.

Figure 5:
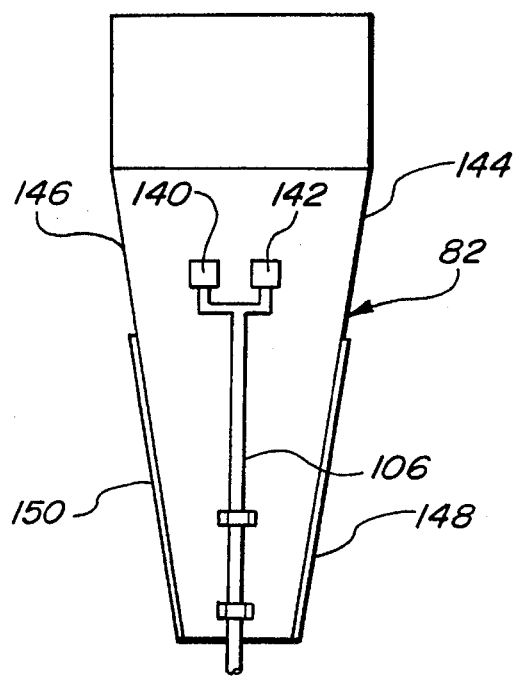
FIG. 5 is a schematic view of the traveler showing an alternative embodiment of the traveler.

With reference to FIG. 5, the single vacuum switch 108 on the traveler 82 can be replaced with a pair of vacuum switches 140, 142. The vacuum switch 142 is set to close at a greater vacuum than the switch 140. The two vacuum switches are used in connection with a two speed pump in place of the single speed pump 68 shown in FIG. 1. When an animal is encountered which feeds more vigorously, and thus produces a greater vacuum in the tube 106, the speed of the feeding pump can be increased to the higher speed, supplying formula at a greater rate to the nipple 102. In addition, to reduce the cycle time, the two-speed pump is used at the higher speed, when filling the formula hose with water, when preheating the feeder and when rinsing the formula hose.

The traveler 82 moves at a relatively slow speed along the track 84 and poses little hazard to people or animals. However, as an additional feature, the front and rear edges 144, 146 of the traveler, as shown in FIG. 5, can be equipped with strip electrical switches 148, 150. When the switches are closed due to contact with an obstacle, the traveler will stop.

The feeder has been described as having a mixing tank 12 for mixing the formula and a second tank, feed tank 62, for storing the mixed formula and from which the formula is pumped to the traveler. This enables the simultaneous mixing of another batch of formula while previously mixed formula is being pumped to the traveler. With separate mixing and feed tanks, one mixing tank can be used to supply multiple feed tanks and travelers. However, the feeder can operate without the use of the feed tank 62 and its associated pump 68. The mixing tank 12 would be used to both mix formula and hold the formula while the pump 58 is used to pump the formula into the formula hose. When the mixing tank is subsequently emptied, the delivery of formula to the animals will be stopped until another batch of formula is mixed in the mixing tank.

Figure 6:
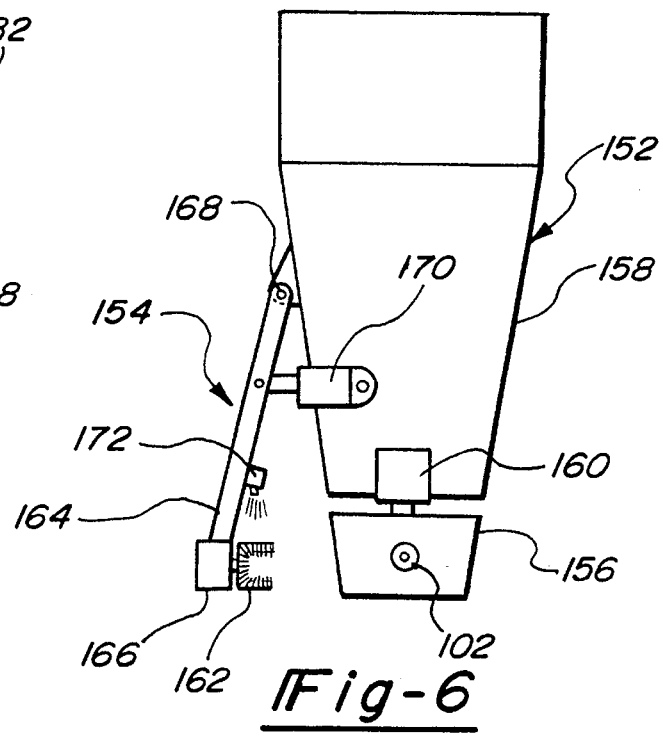
FIG. 6 is an elevational view of the traveler showing a mechanical nipple sanitizer.

With reference to FIG. 6, an alternative traveler 152 is shown which is similar to the traveler 82. However, the traveler 152 is equipped with a mechanical nipple sanitizer 154. The traveler 152 has the nipple 102 mounted to a lower portion 156 of the traveler which is coupled to an upper portion 158 by a gear motor 160 having a vertically oriented output shaft. For sanitizing the nipple, the lower portion 156 of the traveler is rotated by the gear motor 90° so that the nipple 102 faces rearward. A nipple brush 162 is mounted to a rotating arm 164 by a second gear motor 166. The arm 164 is movable about a pivot 168 by an air cylinder, or other actuator 170, carried by the upper portion 158 of the traveler. With the nipple 102 facing rearward, the actuator 170 moves the brush 162 onto the nipple while the gear motor 166 rotates the brush. A liquid sanitizer spray nozzle 172 sprays a liquid sanitizing agent onto the brush and nipple during cleaning of the nipple. The mechanical sanitizer can be used instead of the simple sanitizer spray described above to further assure sanitation and to prevent the spread of disease.

Figure 7:
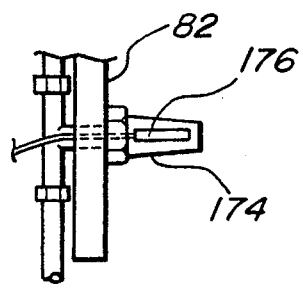
FIGS. 7 and 8 are fragmentary side elevational views of the traveler showing alternative embodiments, including a temperature sensor for measuring the body temperature of each animal being fed.

As a further aid to the operator, the traveler can be equipped with an animal temperature sensor to identify animals that are ill. One way of sensing the animal temperature is to utilize the nipple 174 which is equipped with a temperature sensor 176, as shown in FIG. 7. The sensor 176 can be used to measure the animals mouth temperature during the initial few seconds after the animal begins to suck on the nipple. The flow of formula to the nipple will be delayed by the length of time necessary to make an accurate temperature measurement to avoid influencing the temperature measurement by the formula.

Figure 8:
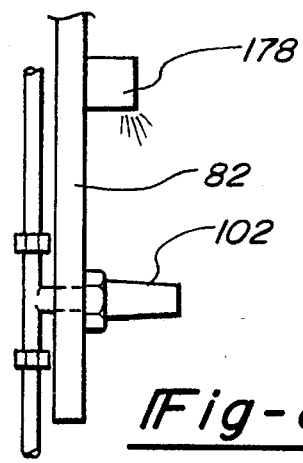

Another possible means for measuring the animal's temperature is shown in FIG. 8 and utilizes an infrared temperature detector 178 mounted to the traveler above a nipple 102. One possible sensor is the Transtemp 700 available from the Williamson Corp. of Concord, Mass. The infrared sensor can be used to measure the temperature from the animal's eye or the fleshy part of the animal's nose. Since the feeding animal will be sucking on the nipple, there is a fairly narrow range of possible locations for the animal's eyes or nose. This enables the eyes or nose to be located by the sensor. If necessary, an artificial intelligence system may be used to first locate the desired part of the animal's anatomy and then direct the infrared sensor to that location.

A third type of temperature measurement can be accomplished with the use of a remote identification tag carried by the animal. A radio frequency interrogator carried by the traveler would send a signal to elicit a response from the tag worn by the animal. The response signal would indicate the present temperature of the animal. Additional information regarding the animal could also be transmitted such as an animal identification.

It is to be understood that the invention is not limited to the exact construction illustrated and described above, but that various changes and modifications not discussed above may be made without departing from the spirit and scope of the invention as defined in the following claims.

I claim:

1. An apparatus for feeding a plurality of animals each housed in individual stalls with individual predetermined rations of formula comprising:

mixing means for mixing a liquid formula, said mixing means including a mixing tank in which liquid and dry ingredients are mixed and means for weighing said mixing tank and the contents thereof;

a feed tank for holding a quantity of formula and means for weighing said feed tank and the formula therein;

first pump means for pumping formula from said mixing tank into said feed tank;

second pump means for pumping formula from said feed tank;

conduit means for directing the flow of the formula from said feed tank, said conduit means including a delivery conduit, a return conduit and a selector valve having a delivery position and a return position for directing formula to said delivery conduit and said return conduit respectively, said return conduit returning formula to said feed tank;

a movable traveler carrying a nipple for sucking by the animals;

means for moving said traveler along a predetermined path and for stopping said traveler in close proximity to each of the stalls whereby the animal in each stall can suck on said nipple, said delivery conduit being in communication with said nipple to deliver formula to said nipple when said selector valve is in said delivery position;

means responsive to an animal sucking on said nipple for changing the position of said selector valve and the direction of formula flow through said conduit means whereby the flow of formula through said conduit means is regulated by an animal through said selector valve; and programmable control means for operating said mixing means to mix formula in said mixing tank, delivering formula from said mixing tank to said feed tank, delivery of the formula to said traveler, movement of said traveler past each of the stalls for feeding the animals and mixing of additional formula in said mixing tank when the quantity of formula in the feed tank reaches a predetermined low level while continuing to feed animals with formula from the feed tank.

2. The apparatus of claim 1 wherein said first and second pump means each includes a single speed pump.

3. The apparatus of claim 1 further comprising a plurality of said feed tanks for holding a quantity of formula, a plurality of said second pump means, a plurality of said conduit means, and a plurality of said travelers with each of said plurality of feed tanks, second pump means, and conduit means being associated with a different one of said plurality of travelers and each of said travelers having a different path of travel past different stalls, and said mixing means having said single mixing tank in which formula is mixed and having means associated with said mixing tank for moving formula from said mixing tank to a selected one of said feed tanks for holding a quantity of formula.

4. The apparatus of claim 1 wherein said control means included means for continuously measuring the quantity of formula in said feed tank by the weight of said feed tank and formula therein to determine the amount of formula consumed by each animal.

5. The apparatus of claim 4 wherein said control means includes means for delivering the individual predetermined ration of formula to each animal by controlling the position of said selector valve and moving said selector valve to said return position when a given animal has consumed its individual predetermined ration of formula.

6. The apparatus of claim 1 further comprising means for preheating said conduit means prior to delivery of formula through said conduit means.

7. The apparatus of claim 1 further comprising means for rinsing said tank and said conduit means after feeding the animals to remove formula residue from said tank and conduit means.

8. An apparatus for feeding a plurality of animals each housed in individual stalls comprising:

mixing means for mixing a liquid formula including a tank for holding a quantity of the formula;

pump means for pumping formula from said tank;

conduit means for directing the flow of the formula from said pump means, said conduit means including a delivery conduit, a return conduit and a selector valve having a delivery position and a return position for directing formula to said delivery conduit and said return conduit respectively, said return conduit returning formula to said tank;

a movable traveler carrying a nipple for sucking by the animals;

means for moving said traveler along a predetermined path and for stopping said traveler in close proximity to each of the stalls whereby the animal in each stall can suck on said nipple, said delivery conduit being in communication with said nipple to deliver formula to said nipple when said selector valve is in said delivery position;

means responsive to an animal sucking on said nipple for changing the position of said selector valve and the direction of formula flow through said conduit means whereby the flow of formula through said conduit means is regulated by an animal through said selector valve; and sanitizing means for sanitizing said nipple before said traveler moves to each stall, said sanitizing means including means for depositing a sanitizing liquid on said nipple and means engaging said nipple for mechanically cleaning said nipple.

9. The apparatus of claim 8 wherein said means engaging said nipple for mechanically cleaning said nipple includes a brush carried by said traveler spaced from said nipple and being movable to a position engaging said nipple to clean said nipple.

10. An apparatus for feeding a plurality of animals each housed in individual stalls comprising:

mixing means for mixing a liquid formula including a tank for holding a quantity of the formula;

pump means for pumping formula from said tank;

conduit means for directing the flow of the formula from said pump means, said conduit means including a delivery conduit, a return conduit and a selector valve having a delivery position and a return position for directing formula to said delivery conduit and said return conduit respectively, said return conduit returning formula to said tank;

a movable traveler carrying a nipple for sucking by the animals;

means for moving said traveler along a predetermined path and for stopping said traveler in close proximity to each of the stalls whereby the animal in each stall can suck on said nipple, said delivery conduit being in communication with said nipple to deliver formula to said nipple when said selector valve is in said delivery position;

means responsive to an animal sucking on said nipple for changing the position of said selector valve and the direction of formula flow through said conduit means whereby the flow of formula through said conduit means is regulated by an animal through said selector valve; and wherein said traveler has front and rear edges relative to the direction of movement of said traveler along said path and further comprising switch means on said front and rear edges of said traveler for stopping movement of said traveler upon engagement of said switch means with an object in said path.

11. An apparatus for feeding a plurality of animals each housed in individual stalls comprising:

mixing means for mixing a liquid formula including a tank for holding a quantity of the formula;

pump means for pumping formula from said tank;

a movable traveler carrying a nipple for sucking by the animals, the nipple being in fluid communication with said pump means for receiving formula and said traveler being movable along a predetermined path in close proximity to each of the stalls whereby the animal in each stall can suck on said nipple; and an infrared sensor carried by said traveler for sensing the temperature of an animal while the animal is sucking said nipple.

12. A method of operating an automated feeding apparatus for feeding a plurality of animals in a feeding cycle in which each animal is fed an individual predetermined ration of feed, said animals being contained in individual stalls, said apparatus having mixing means for mixing a batch of formula having a quantity which is less than a sum of the predetermined rations of formula for the animals to be fed and formula delivery means coupled to said mixing means and movable along a predetermined path for sequentially delivering formula from said mixing means to each of the animals in the stalls, said method comprising the steps of:

mixing a batch of formula;

sequentially delivering the individual predetermined rations of formula to the animals in the stalls along the path by moving the delivery means along the path to each of the animals;

measuring the quantity of mixed formula available for delivery to the animals;

while sequentially delivering the formula to the animals, when the quantity of mixed formula available for delivery to the animals reaches a predetermined low value, mixing an additional batch of formula; and repeating the preceding step until each animal has been fed.

13. The method of claim 12 wherein the mixing means includes a mixing tank and a feed tank, said method further comprising the steps of:

mixing the batch of formula in the mixing tank;

moving the batch of formula from the mixing tank into the feed tank; and delivering formula to the animals from the feed tank whereby mixing of additional batches of formula can occur simultaneous with the delivery of formula to the animals.

14. The method of claim 12 further comprising the steps of:

when the quantity of mixed formula available for delivery to the animals reaches said predetermined low value, calculating the sum of the predetermined rations of formula for the animals remaining to be fed along said path; and comparing said sum to said predetermined quantity of the formula of said batch and, if said sum is less than said predetermined quantity of the formula of said batch, mixing a partial batch of formula equal to said sum whereby essentially no formula is left over after the last animal has been fed.

15. The method of claim 14 further comprising the step of delivering water through said conduit means to push the last of the formula being delivered whereby essentially no formula is left over after the animals have been feed.

16. The method of claim 12 further comprising the step of recording the quantity of formula consumed by each animal along said path.

17. The method of claim 12 wherein said mixing step is accomplished by adding water and feed ingredients individually to a tank and weighing the quantity of water and feed ingredients as they are added to the tank whereby formula of a predetermined concentration is mixed.

18. The method of claim 17 wherein said water is added to the tank by adding predetermined proportions of hot and cold water each having known temperatures whereby the mixed formula has a predetermined temperature.

19. The method of claim 12 further comprising the step of preheating said conduit means with a heated liquid prior to delivering formula through said conduit means.

20. The method of claim 12 further comprising the step of rinsing said mixing means, said conduit means and said formula delivery means after the completion of a feeding cycle to remove formula residue from said apparatus.

21. A method of operating an automated feeding apparatus for feeding a plurality of animals in a feeding cycle in which each animal is fed a predetermined ration of feed, said animals being contained in individual stalls, said apparatus having mixing means for mixing a batch of formula having a quantity which is less than a sum of the predetermined rations of formula for the animals to be fed, formula delivery means movable along a predetermined path for sequentially delivering formula from said mixing means to each of the animals in the stalls, said formula delivery means including a nipple for sucking by an animal for receiving formula, conduit means for coupling said mixing means to said delivery means, said conduit means including a delivery conduit connecting said mixing means to said formula delivery means and a return conduit to return formula to said mixing means, pump means for pumping formula through said conduit means, and programmable control means for operating said mixing means to mix formula, for moving said formula delivery means along said predetermined path, for stopping said formula delivery means at each stall along said path, and for recording the amount of formula consumed by each animal; said method comprising the steps of:

mixing a first batch of formula;

moving said formula delivery means sequentially to the stalls along said path for the animals to receive rations of formula by sucking on the nipple;

measuring the quantity of formula consumed by each animal and recording the measured quantity;

measuring the quantity of mixed formula available for delivery to the animals;

while sequentially delivering the formula to the animals, when the quantity of mixed formula available for delivery to the animals reaches a predetermined low value, mixing an additional batch of formula; and repeating the preceding step until each animal has been fed.

22. The method of claim 21 further comprising the step of selecting the direction of formula flow between said delivery conduit and said return conduit in response to action of the animal being fed and the position of said formula delivery means along said path.

23. The method of claim 21 further comprising the steps of:

when the quantity of mixed formula available for delivery to the animals reaches said predetermined low value, calculating the sum of the predetermined rations of formula for the animals remaining to be fed along said path; and comparing said sum to said predetermined quantity of the formula of said batch and, if said sum is less than said predetermined quantity of the formula of said batch, mixing a partial batch of formula equal to said sum whereby essentially no formula is left over after the last animal has been fed.

* * * * *